United States Patent
Deck et al.

(10) Patent No.: US 11,107,284 B2
(45) Date of Patent: Aug. 31, 2021

(54) SYSTEM AND METHOD FOR VISUALIZATION OF SYSTEM COMPONENTS

(71) Applicant: Dell Products L.P., Round Rock, TX (US)

(72) Inventors: Richard C. Deck, Austin, TX (US); Scott C. Lauffer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/456,892

(22) Filed: Jun. 28, 2019

(65) Prior Publication Data
US 2020/0410762 A1 Dec. 31, 2020

(51) Int. Cl.
| | |
|---|---|
| *G06T 19/00* | (2011.01) |
| *H04L 29/08* | (2006.01) |
| *G06T 19/20* | (2011.01) |
| *G06F 11/34* | (2006.01) |

(52) U.S. Cl.
CPC ........ *G06T 19/006* (2013.01); *G06F 11/3447* (2013.01); *G06T 19/20* (2013.01); *H04L 67/18* (2013.01)

(58) Field of Classification Search
CPC ....... G06T 19/006; G06T 19/20; G06F 11/32; G06F 11/324; G06F 11/328; G06F 11/3447; H04L 67/18
See application file for complete search history.

(56) References Cited

U.S. PATENT DOCUMENTS

| | | | | |
|---|---|---|---|---|
| 9,361,716 B1* | 6/2016 | Erikson | ................... | G06T 11/00 |
| 10,685,495 B1* | 6/2020 | Booysen | ................ | G06T 15/00 |
| 2010/0023859 A1* | 1/2010 | Dawson | .................. | H04L 45/22 |
| | | | | 715/706 |
| 2011/0218730 A1* | 9/2011 | Rider | ..................... | G01C 21/00 |
| | | | | 701/533 |
| 2011/0241833 A1* | 10/2011 | Martin | .................. | G08C 21/00 |
| | | | | 340/10.1 |
| 2012/0249588 A1* | 10/2012 | Tison | .................... | G06F 1/1696 |
| | | | | 345/633 |
| 2012/0255710 A1* | 10/2012 | Maselli | ................ | H05K 7/1497 |
| | | | | 165/80.2 |
| 2013/0031202 A1* | 1/2013 | Mick | ........................ | G06F 3/00 |
| | | | | 709/217 |
| 2014/0006762 A1* | 1/2014 | Bittner | .................. | G06F 11/328 |
| | | | | 713/1 |
| 2014/0146038 A1* | 5/2014 | Kangas | ................... | G06T 19/20 |
| | | | | 345/419 |
| 2018/0365495 A1* | 12/2018 | Laycock | .................. | G06K 9/46 |
| 2020/0034622 A1* | 1/2020 | Thakurta | ................ | G05B 15/02 |

* cited by examiner

*Primary Examiner* — Jeffery A Brier
(74) *Attorney, Agent, or Firm* — Terrile, Cannatti & Chambers, LLP; Stephen A. Terrile

(57) ABSTRACT

A system, method, and computer-readable medium for modeling and diagnosing a system. System identification information captured by an AR system is used to identify the system and one or more of a model of the components of the system or an overlay of the system is retrieved from a repository or generated based on component identification information or component performance data and sent to the AR system. A composite view of the model or overlay relative to a dynamic image or model of the system allows a technician to visualize the system and components and diagnose the operation of the system without opening the system.

17 Claims, 6 Drawing Sheets

SYSTEM AND METHOD FOR VISUALIZATION OF SYSTEM COMPONENTS

BACKGROUND OF THE INVENTION

Field of the Invention

The present invention relates to information handling systems. More specifically, embodiments of the invention relate to visualization of components in a system and a configuration of the system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for visualization of the components and configuration of a system and for diagnosing the operation of the system. In certain embodiments, a modeling operation includes capturing system identification information by an augmented reality (AR) system; identifying the system based on the captured system identification information; and sending a model of the components and configuration associated with the system or an overlay based on the model to the AR system along with associated information and performance data. In certain embodiments, the AR system displays a real time view of a system and superimposes an overlay based on the model with performance data relative to a component in the system, resulting in a composite view of the system and any associated data. In certain embodiments, an internal camera captures information or data to assist with identifying components diagnosing operation of the system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
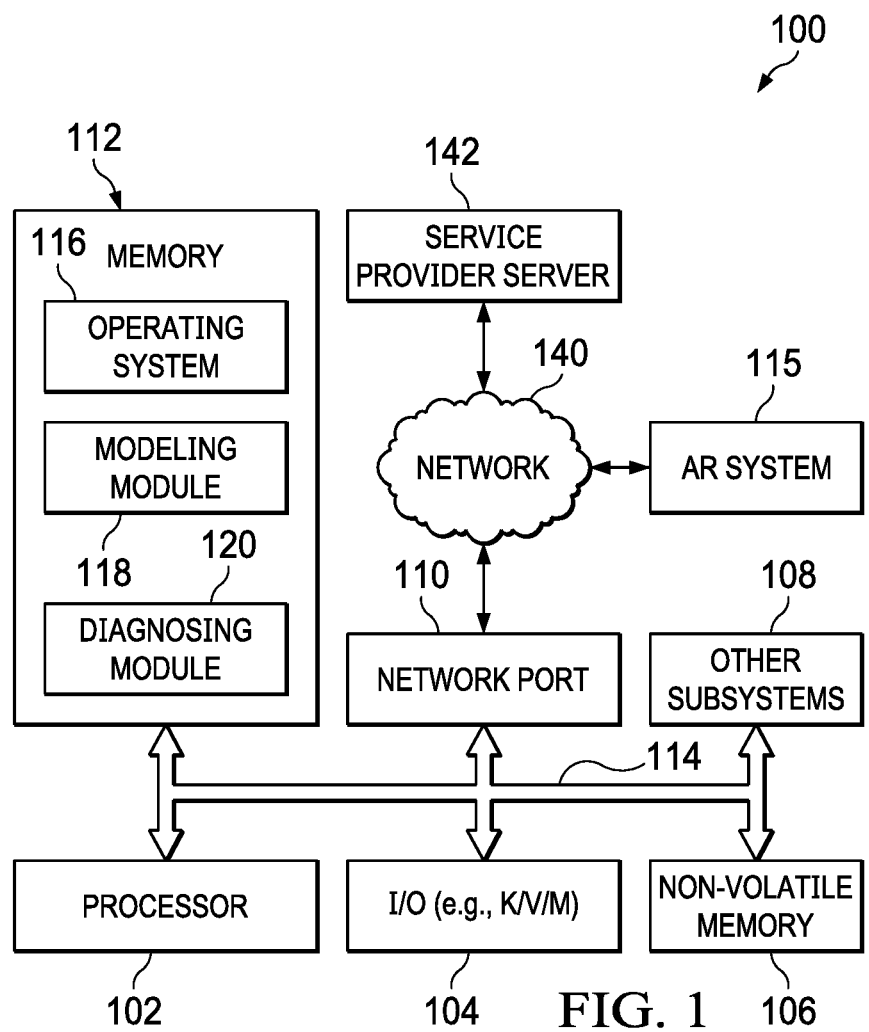
FIG. 1 shows a general illustration of components of an information handling system as implemented in the system and method of the present invention.

Various aspects of the disclosure include an appreciation that it is known to use information handling systems and related IT systems within information technology (IT) environments such as data centers. In such IT environments any errors or issues with the systems affects processing capabilities. As these systems increase in complexity, there is increase pressure on technicians to quickly access the systems to inspect the components, troubleshoot the system in response to error codes and other servicing requirements, and upgrade components.

To inspect the system, a technician might need to shut down the system or data center in order to open the system and visually inspect the components. However, once the system has been opened, the system performance may change such that the reason for the error code is not obvious. One particular issue found in some environments such as data centers is that some of the servers might be too high or otherwise situated poorly for a technician to see easily, or the top cover of the server may be opened for only a limited time, giving the technician a limited ability to identify an issue.

Various aspects of the disclosure include an appreciation that an issue with troubleshooting complex systems is the likelihood that components can affect the performance of other components, such that the system sends a generic error code or sends an error code for one component but the issue to be resolved is related to another component. For example, if a server in a data center sends an error code that the system is overheating or the performance is below a threshold, the error code provides an insufficient explanation of what component is causing the server to send the error code. Furthermore, the issue may require the technician to perform multiple diagnosing iterations to correct the issue. For example, a possible reason for overheating is fan failure, so a technician might power down the system, open the system, replace the fan, close the system and reboot the system. Ideally, the fan was the cause of the error code and the technician fixed the problem. However, if the fan was working properly but a faulty sensor sent the error code, replacing the fan is unlikely to fix the problem and the technician will need to troubleshoot the system further to identify the faulty sensor. Similarly, if a component was overheating and the fan ran excessively to cool the component but finally failed, replacing the fan is unlikely to fix the problem and the technician will need to troubleshoot the system further to identify the component causing the system to overheat that caused the fan to run excessively. In these scenarios, the system may be shut down and rebooted multiple times until the technician has identified the problem (s) or the entire system is replaced. In the meantime, the system will continue to incur costs for replacing components, the technician will continue to dedicate time to fixing the issue, and the system will continue to have delays or outages in processing.

Accordingly, a system, method, and computer-readable medium are disclosed for visualizing the components and configuration and diagnosing the operation of a system. In certain embodiments, a modeling operation includes capturing system identification information by an augmented reality (AR) system; identifying the system based on the captured system identification information; and sending a model of the components and configuration associated with the system or an overlay based on the model to the AR system along with associated information and performance data. In certain embodiments, the AR system superimposes an overlay over a dynamic image of the system. In certain embodiments, an overlay comprises multiple panes of performance data and the AR system displays an overlay with performance data over a dynamic image of the system. In certain embodiments, an internal camera captures information or data to assist with identifying components diagnosing operation of the system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one of a modeling module 118 and a diagnosing module 120.

An augmented reality (AR) system 115 comprises a camera or other features configured for displaying dynamic images and communicating information over the network 140. A dynamic image displayed on an AR system changes with any change in the position or orientation of the AR system. As such, as the AR system pans, zooms, rotates or otherwise changes its position or orientation relative to a system, the image displayed on the screen changes. In certain embodiments, an AR system comprises a smart device, tablet, PDA or other portable information handling system with a camera and sensors to determine its position and orientation relative to a system.

The modeling module 118 performs a modeling operation. In a modeling operation, components within a system are viewable regardless of whether the components are visible (the system is open) or the components are hidden or otherwise not visible (the system is closed). In certain embodiments, an augmented reality (AR) system positioned near a system scans the system. In an IT environment such as a data center, an AR system positioned near a rack of information handling systems scans the rack and captures information associated with the rack and systems.

In certain embodiments, a system is closed and a QR code, a SKU, label or some other system identification information is scanned or an image of the system exterior is captured by the AR system. The system identification information is analyzed by the AR system to identify the system and then sent to the modeling module, or the AR system sends the system identification information to the modeling module and the modeling module processes the information to identify the system. A repository is accessed for associating the system identification information with a system. A model repository is accessed and a model of the components in a configuration associated with the system identification information or an overlay based on the model is retrieved and sent to the AR system. In certain embodiments, the modeling module 118 communicates a model of the components and configuration with an overlay of any associated information and data for a set of internal components to the AR system, allowing a technician to see a composite view of the system and the model to visualize the set of internal components for a system without shutting down the system or opening the system. A composite view of a model or overlay displayed over a dynamic image of the system allows the technician to analyze the operation of the system without interrupting the system or nearby systems to understand factors outside the system that affect the system. For example, for a system in a rack of systems, the ability to visualize a system without pulling the system from the rack allows a technician to visualize how systems above, below and beside the system can affect the thermal buildup of the system.

In certain embodiments, the AR system captures component identification information and a repository storing information associating the system with component identification information is accessed, a model of the components and configuration or an overlay based on the model is generated based on the component information, and the generated model or overlay is sent to the AR system for superimposing over the system or displayed offset to the system. The component identification information comprises one or more of geometric information, location and physical characteristics including color, texture and graphic and textual information for each component.

The diagnosing module 120 performs a diagnosing operation. In a diagnosing operation, the diagnosing module associates performance data with each component and ensures the performance data corresponds to a component in the model or an overlay based on the model.

In certain embodiments, an overlay comprises a single pane with all associated information and data on the pane. For example, an overlay for an information handling system includes a model of the CPU and CPU utilization speed, temperature, power usage and other parameters are displayed over a model of the CPU. In certain embodiments, an overlay comprises multiple panes. Each pane can associate a specific performance parameter with the system. Examples of panes for an information handling system include a thermal pane for visualizing thermal generation and cooling by each component in the system, a workload pane for visualizing the processing or other work performed by each component in the system, a fault pane for visualizing which components have associated faults, and a power pane for visualizing power usage by each component.

In certain embodiments, the diagnosing module generates a model with an overlay that associates performance data with a component. Real time performance data may be communicated to the AR system over a wired or wireless connection. OpenManage Mobile available through Dell Technologies, Inc. is an example of an application executable on a smart device that can communicate with information handling systems such as servers in an IT environment using Wi-Fi and display performance data, including real time performance data. In certain embodiments, the diagnosing module retrieves performance data stored in a repository and communicates the performance data to an augmented reality (AR) system and the AR system allows a user to view the system with a dynamic overlay. For the purposes of this disclosure, augmented reality (AR) may be defined as a technology that superimposes a computer-generated image on a user's view of the real world, thus providing a composite view of the system and the model of the system. In certain embodiments, an AR system interacts with a modeling module or diagnosing module to retrieve information regarding a system or components corresponding to a unique set of system identification information. In certain embodiments, either the modeling module, the diagnosing module or the AR system receives information, such as performance information, from other sources within the environment in which the information handling system resides. In certain embodiments, the other sources include a server or datacenter performance analysis tool such as the Live Optics performance analysis tool available from Dell Technologies, Inc. The AR system comprises sensors and uses the sensors to establish a position and orientation of the AR system relative to the system. Accordingly, as a user moves relative to the system, the AR system adjusts the size and orientation of the model or overlay as needed to allow the user to see the components and any corresponding data and information.

The ability to view a model of a system and see changes to the system or components allows a technician to diagnose the operation of a system without shutting down the system, opening the system, swapping components or otherwise performing manual steps to diagnose the system. For example, in a server or other information handling system with multiple power supplies but closed, a technician views a model of the system to see what happens to performance and cooling when one power supply is disconnected. As the technician moves around the closed system, the AR system updates the size and orientation of the model based on the position and orientation of the AR system.

If the system is opened, the AR system displays a composite view of a dynamic image of the system with an overlay based on the model, and the technician views a real time view of the system with performance data displayed relative to a corresponding component. For example, in the server or other information handling system with multiple power supplies described above but now opened, the technician can view the components in the system with an overlay of performance data to see what happens to performance and cooling when one power supply is disconnected. If there are no changes to performance, the technician sees this in real time and might determine there is a faulty power supply and even see which power supply should be replaced. If the performance of a CPU decreases, the technician also sees this in real time and sees performance of other components and determines the power supply was working properly and also identifies other components that need replacing.

In certain embodiments, an internal camera is accessed to capture or record blockages, fans not spinning, internal error lights, or other visual events that could give a visual clue a technician useful for diagnosing the system. In certain embodiments, the modeling module 118 accesses the internal camera to identify components in the system. In certain embodiments, the diagnosing module 120 receives performance data for a system and accesses the internal camera to associate a component with why the system is not operating within expected performance parameters. For example, an error code indicates a system is overheating and the diagnosing module accesses an internal camera, records a short video of a fan, and associates the video with a model or an overlay of the system. When a technician starts diagnosing the system to correct the overheating and watches the video, the technician will see if the fan was spinning as designed. If the fan was not spinning, watching the video recorded by the internal camera could confirm a possible solution, whereas if the technician had to power down the system and take time to open the system, the fan could have been spinning but stopped by the time the technician opened the system and therefore presented a false confirmation. In certain embodiments, a model or an overlay based on the model is displayed on an augmented reality (AR) system and component information, performance data or visual events detected by the internal camera are presented with the overlay.

Figure 2:
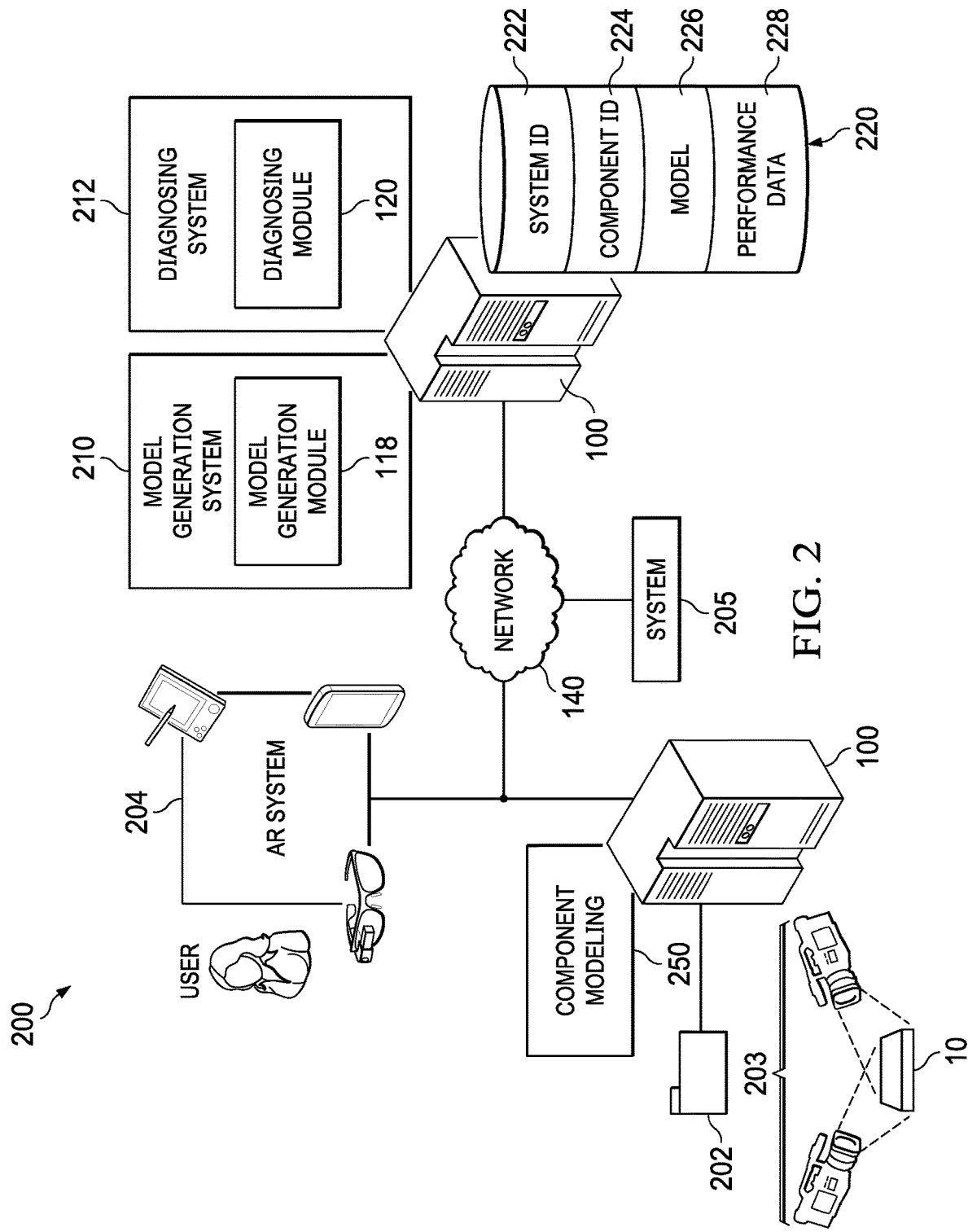
FIG. 2 shows a block diagram of an in-situ visualization environment.

FIG. 2 is a block diagram of a system visualization environment 200 implemented in accordance with an embodiment of the invention. The system visualization environment 200 includes at least one of a component modeling system 250, a model generation system 210 and a diagnosing system 212.

In various embodiments, the model generation system 210 executes on a hardware processor 102 of an information handling system 100. In these and other embodiments, the model generation system 210 communicates with the system 205, a repository 220, an AR system 204, component modeling system 250 and a diagnosing system 212.

Model generation system 210 sends component models and system models to a repository. In certain embodiments, the model generation system receives CAD files 202 from a manufacturer, vendor or other source or the component modeling system 250 scans a component and sends the information to the component model generation system.

In certain embodiments, the model generation system 210 generates a system model based on component models. In certain embodiments, the model generation system receives configuration information associated with a design configuration and generates the system model based on the configuration information. In certain embodiments, the model generation system generates a set of system models, wherein each system model comprises the same components but in a unique design configuration. For purposes of this disclosure, a design configuration refers to any configuration which has been tested to achieve a performance level. A system is assembled according to a design configuration, wherein the design configuration corresponds to the set of components installed in the system.

In certain embodiments, a system model comprises a 3D representation of the system with all components in the system. The system model is viewable and can be rotated, panned, or otherwise adjusted to allow a user to view the model from any angle. In certain embodiments, the system model is generated such that each component can be isolated, sets of components can be grouped, or the model is viewable as a single entity. In certain embodiments, a set of models is generated, wherein a first model in the set of models corresponds to the system model, wherein other models correspond to components or groups of components. For example, a cooling system model corresponds to all components responsible for cooling the system, a heat generation system model corresponds to all components that heat, and a processing system model corresponds to all components with processing capabilities. A system model may be opaque, transparent, or some combination. In certain embodiments, an overlay based on the model is generated and displayed relative to the system.

An overlay in an assembly process has details to allow a user to identify the component and validate the configuration. An overlay generated during a step in the assembly process in which not all components on the BOM are installed or the BOM is incomplete is used to identify and validate the assembly process up to that point. If a system is validated at a first step and does not pass validation at a second step, an inspector compares the two validation overlays to identify the change and correct the system or change the process. In certain embodiments, an overlay is generated to be viewed with the same size, shape, color, texture, markings or other physical characteristic as the system. In various embodiments, a transparent or semitransparent overlay superimposed over a system allows a technician to view components and a transparent overlay with opaque portions superimposed over a system allows the user to see selected components.

An overlay in a servicing process has information needed for servicing the system. In certain embodiments, the model generation system sends a first model from the component models associated with the BOM to the AR system, along with a set of overlays comprising performance data. A technician can see a composite view of the model and the set of overlays or a composite view of the system with the set of overlays. Each overlay on the set of overlays is based on the system model and comprises performance data. In certain embodiments, there is one overlay in the set of overlays with all the component identification and associated performance data. In certain embodiments, there are multiple overlays in the set of overlays, with each overlay comprising component identification information and performance data for a selected set of replacement components. Each overlay on the set of overlays is based on the system model and comprises historical or present performance data. In certain embodiments, there are multiple overlays in the set of overlays, with each overlay comprising component identification information and performance data for a selected set of replacement components in a design configuration.

An overlay in an upgrade process displays information and performance data for upgrading the system. In certain embodiments, the model generation system sends a first model from the component models associated with the BOM to the AR system, along with a set of overlays comprising performance data. A technician can see a composite view of the model and the set of overlays or a composite view of the system with the set of overlays. Each overlay on the set of overlays is based on the system model and comprises historical or present performance data. In certain embodiments, there are multiple overlays in the set of overlays, with each overlay comprising component identification information and performance data for a selected set of upgrade components in a design configuration. As used herein, an AR system 204 refers to an information handling system such as a tablet computer, a personal digital assistant (PDA), a smart phone, a mobile telephone, an augmented reality (AR) system, or other device that is capable of scanning, capturing or recording information, communicating with one or more of the model generation system 210, the diagnosing system 212 and the system 205, and processing information and data. In various embodiments, the AR system 204 is configured to present a modeling user interface and a diagnosing user interface. In some embodiments, the AR system comprises sensors such as accelerometers for determining a position or orientation of the AR system or determining a change in a position or orientation of the AR system.

In various embodiments, the AR system 204 communicates to exchange information with the system 205, a model generation system 210 and a diagnosing system 212 through the use of a network 140. In certain embodiments, the network 140 may be a public network, such as the Internet, a physical private network, a wireless network, a virtual private network (VPN), or any combination thereof In certain embodiments, the AR system communicates with the system through Wi-Fi, Bluetooth or other wireless technology directly and communicates with the visualization system and diagnosing system over the network. Skilled practitioners of the art will recognize that many such embodiments are possible, and the foregoing is not intended to limit the spirit, scope or intent of the invention.

In various embodiments, the visualization environment 200 includes a storage repository 220. The storage repository may be local to the system executing the modeling module 118 or may be remote. In various embodiments, the storage repository 220 includes one or more of a system identification information repository 222, a component identification information repository 224, a model repository 226 and a performance data repository 228.

An AR system communicates with system identification information repository 221 storing information relating the size, shape, color, texture, location of text or other markings or physical characteristic to a system, along with any other information useful for identifying the system. In certain embodiments, the AR system captures system identification information and the information stored in the system identification information repository is used to identify the system 205. In various embodiments, the system identification information repository stores information used for generating a model or an overlay of the system 205 or sends information to the modeling module for generating a model or an overlay of the system. Information sent by the system identification information repository to the modeling module can vary from a simple wireframe representation of the casing or exterior of the system to more detailed representations that include structures or other features for identifying where a component is located in the system.

The component identification information repository 222 stores information relating the size, shape, color, texture, location of text or other markings or physical characteristic to each component in a system. For information handling systems, the component identification information repository stores identification information of processing components such as processors, memory cards and video cards, and also stores identification information about auxiliary components such as fans, cooling tubes, buses, batteries, cables and relays. In certain embodiments, component identification information repository 222 receives information from component modeling system 250. Component modeling system 250 receives component information in the form of files 202 such as CAD files received from a manufacturer or vendor or from scanning system 203 scanning a component.

If the system is closed, once the system is identified, the information stored in the component identification information repository is able to identify the components in the system. In certain embodiments, a bill of materials (BOM) generated at the time of manufacture is stored in the component identification repository and contains a list of all components installed in the system. If the system is open, component identification information captured by the AR system is compared against the information stored in the component identification information repository to confirm the components in the system and confirm the configuration of the system. The information stored in the repository can distinguish between types of components or between manufacturers, models or variations of components.

In various embodiments, the model generation repository 226 stores a basic model of each component and a serial number or other information usable to identify the system. In various embodiments, the model generation repository stores CAD files 202 of components or models generated based on CAD files or developed from component modeling system 203 scanning each component 10 from multiple angles. In certain embodiments, component identification information stored in the component identification information repository comprises a wireframe model of a component and includes information about the manufacturer, a model number, a serial number, a lot number, a physical characteristic such as color, texture, or graphics, or other information that would identify the component. In other embodiments, the model generation repository 226 stores a detailed model of each component, such as a CAD solid model of a memory card that shows details such as the physical dimensions, the color, texture and the type of connector and also shows graphic information such as a logo of the manufacturer, a label that would include information such as a model number, a serial number, a lot number, or other text information and any other information that would identify the component using multiple characteristics.

In addition to storing information for component identification, the model generation repository stores information about a system 205 that associates the components with the configuration of the system. In various embodiments, the model generation repository stores information usable to generate a model or an overlay of the configuration for the system 205 or sends information to the visualization module for generating a model or an overlay corresponding to the components and configuration of the system. In various embodiments, the model repository stores multiple models for a system, in which a first model is generated during assembly of the system and a second model is generated to allow a technician to visualize changes in the components or configuration of the system. In various embodiments, the second model is generated in real time.

One or more of the model generation module 118 and the diagnosing module 120 determines whether to send a model or an overlay to the AR system, including what component identification information and what performance data should be sent to the AR system. The model generation module determines if the system is open or closed. In certain embodiments, if the system is closed, the model generation module sends a 3D model. In certain embodiments, if the system is open, the model generation module sends a 3D model or an overlay. In certain embodiments, the model generation module sends a 3D model that is displayed offset relative to the system so a user can view the 3D model beside the system. In certain embodiments, the model generation module sends an overlay that is displayed in a composite view of the system or an image of the system. Other factors such as the available bandwidth and memory or user preferences determine what model or overlay is sent. An AR system with limited memory, a smaller screen, a slower processor or connected to a network with limited bandwidth might receive a model or an overlay that has a smaller file size. The model generation module also allows the AR system or a technician using the AR system the option to request more information. For example, an AR system or a technician might have difficulty identifying a component using a basic wireframe model if the component is in a confined space or if the system being scanned is in a dirty or poorly lit area. In these environments, the technician can select an option for more details and the model generation module sends a more detailed overlay or sends more detailed component identification information.

The performance data repository 228 stores information related to the performance of a system and the components in the system. In various embodiments, the performance data repository 228 contains historical information about each component, such as CPU processing speed, memory usage, temperature, and other performance parameters. Thus, if an error code is received that a fan spins for ten minutes but historically the fan never operated longer than five minutes, that historical information can assist a validation or troubleshooting operation. If a memory card has historically used less than 20% of its memory but memory increased to 90% in the last two days, that historical information could indicate an issue with a nearby memory card not being accessible or read/write errors with the memory card.

When the system is open, the AR system receives an overlay based on the model sent by the model generation module and creates a composite view comprising a dynamic view of the system with the overlay superimposed over the dynamic image, including information or data associated with components. An overlay allows a technician to check each component and the configuration of components to determine if components are missing, if there are incorrect components installed, if the installed components are inefficient or outdated, or if the configuration is insufficient or inefficient. In certain embodiments, the AR system is configured to superimpose an overlay over a dynamic image of the system in real time and the AR system is configured to rotate, pan, zoom or otherwise update the overlay relative to the image as the AR system moves relative to the system. The generation of an overlay with an accurate representation of the components and configuration of the system that is updated as the AR system moves relative to the system allows a technician to view the system and to identify the components and optimize the configuration.

Figure 3:
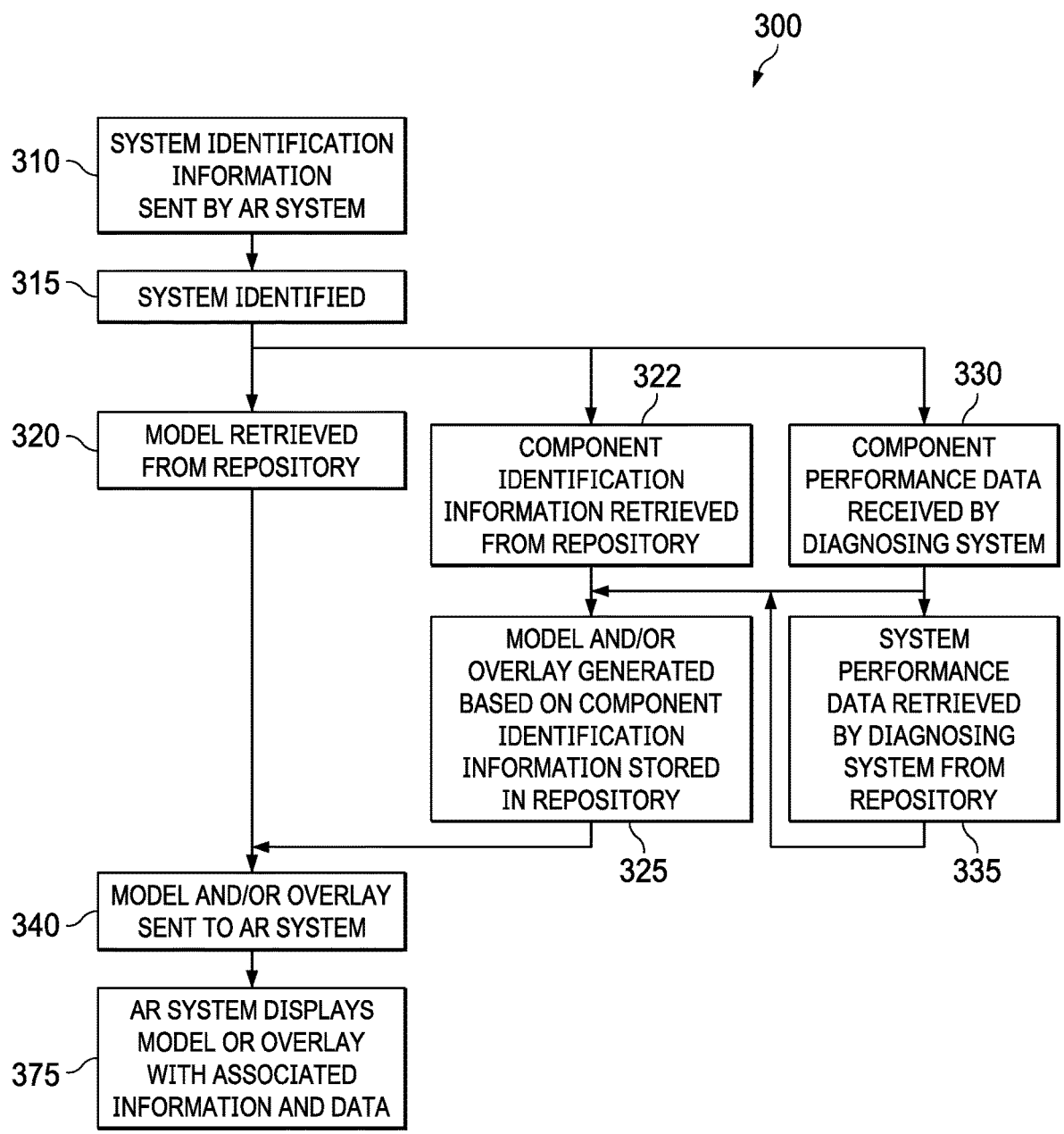
FIG. 3 shows a high level flow chart of a component visualization and diagnosing process.

FIG. 3 shows a high level flow chart depicting a system modeling operation 300. Specifically, FIG. 3 depicts a model generation process and a diagnosing process. In a model generation process, system identification information is captured and used to identify the system, a model depicting the components in the system is retrieved from a repository and the model or an overlay based on the model is sent to an AR system, enabling a technician to see a composite view of the system and the model or overlay to visualize the internal components of the system in an open or closed state. The technician can view the model or overlay relative to the actual components to determine if the system contains the correct components and in a configuration previously determined to operate within designed parameters. In certain embodiments, a model or an overlay is generated based on components in a list stored in a repository. In a diagnosing process, one or more of the performance data of the actual components and the stored performance data are viewable relative to the model or overlay to enable a technician to understand how the system is operating or how the system was operating before an event. In each of these processes, physical access to the system is not necessary.

In various embodiments, the model generation operation or diagnosing operation begins at step 310 when system identification information is sent to a visualization module. In certain embodiments, the AR system captures system identification information. In certain embodiments, the AR system contains hardware such as a camera to capture an image of the system and send the captured image to the model generation module. In other embodiments, the AR system contains hardware such as a scanner and software to identify the system identification information and send the system identification information to the model generation module. In certain embodiments, the system identification information is located on an exterior surface or is otherwise accessible by the AR system such that the system identification information can be captured while a system 205 is closed and still operating.

In step 315, the system is identified based on the system identification information. In certain embodiments, the model generation module or diagnosing module searches a repository to identify a system referenced by the system identification information.

In certain embodiments, the model generation module or diagnosing module retrieves a model or an overlay stored in a repository based on the system identification information. In step 320, the model generation module or diagnosing module retrieves from the repository a model or an overlay based on a determination that the system is opened or closed and other factors such as bandwidth of the network and storage capacity or processing capabilities of the AR system. A repository storing a model and an overlay for a system 205 may be beneficial when the system 205 is turned off or otherwise not capable of communicating.

In certain embodiments, a model or overlay is generated based on component identification information. In certain embodiments, in step 322, the model generation module or diagnosing module uses system identification information stored in the system identification information repository to identify the system and a component identification information repository to identify components corresponding to that system. In certain embodiments, the model generation module or diagnosing module retrieves a BOM (bill of materials) for a system that lists all the components in the system. In certain embodiments, in step 325, a model and/or overlay is generated based on the component identification information. In certain embodiments, in step 330, the visualization module or diagnosing module receives component performance data to identify components in the system. In certain embodiments, in step 335, the model generation module or diagnosing module uses component performance data retrieved from a repository to identify components in the system.

In step 340, a model or an overlay is sent to the AR system, along with any associated information. The associated information can include system identification information, component identification information and performance data. In certain embodiments, the associated information and data includes other information including installation and maintenance records, performance requirements, error code history and warranty information. In certain embodiments, multiple models or overlays are sent to the AR system. If component identification information stored in a repository does not match component identification information determined based on real time or stored component performance data, a first model or overlay corresponding to the stored component identification information and a second model or overlay corresponding to component identification information determined from the real time or stored component performance data are sent to the AR system.

In step 375, the AR system displays a composite view of the model or overlay relative to a dynamic image of the system with any associated information and data. In certain embodiments, the AR system displays a wire frame or other simplified model of the system with a detailed overlay of the installed components, allowing a technician to visualize the components in the system relative to physical features of the system. In certain embodiments, if the system is closed, the AR system displays a model or overlay relative to the external geometry of the system. In certain embodiments, if the system is open, the AR system superimposes an overlay over a dynamic image of the internal geometry or components of the system or displays a model offset to the system. As the AR system is moved relative to the system, the model generation module, diagnosing module or AR system updates the model or overlay to allow the technician to visualize the system from any angle. The ability to visualize the system from any angle and relative to physical features of the system allows a technician to evaluate the configuration and identify options for removing components, reconfiguring the system, and other servicing requirements.

Figure 4:
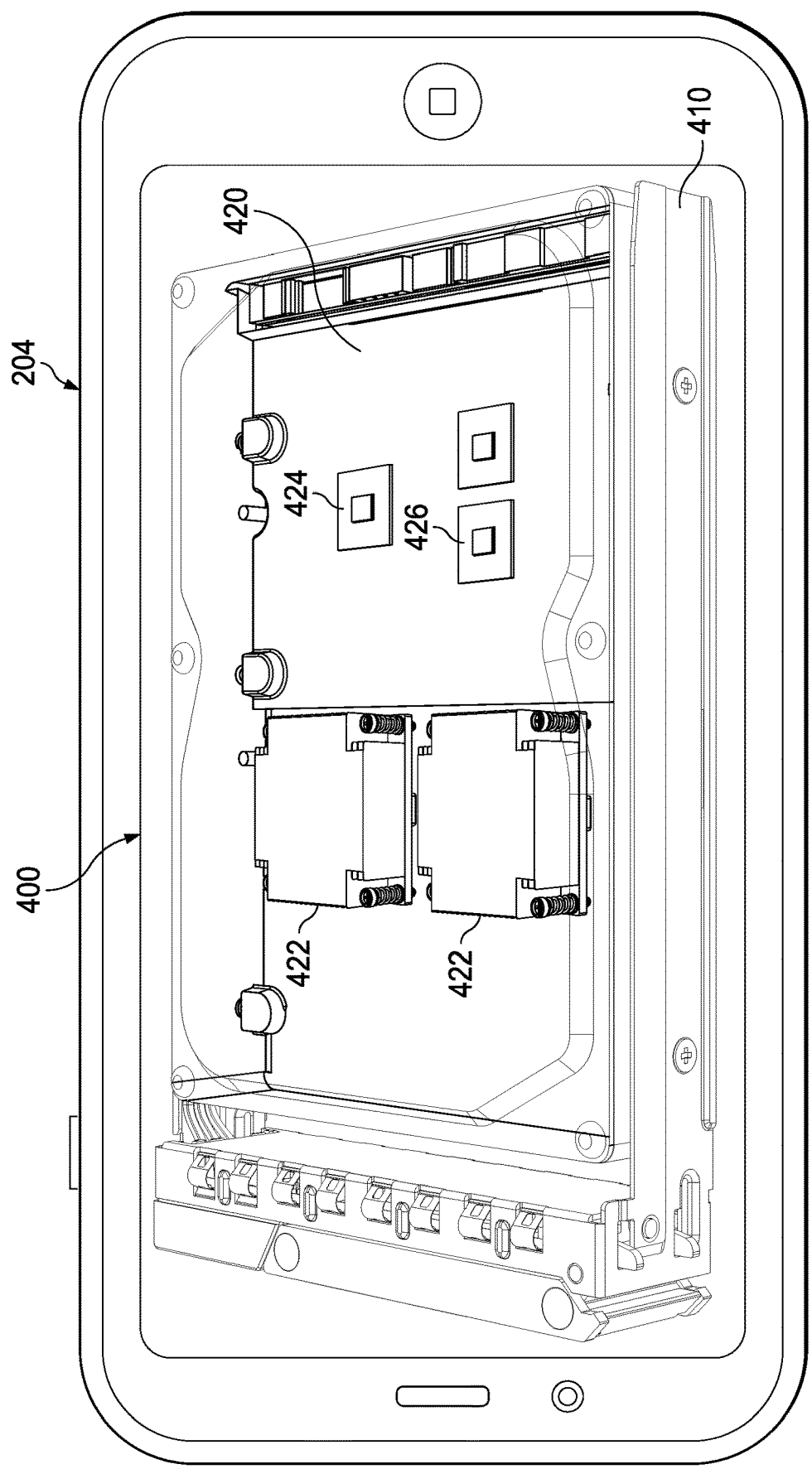
FIG. 4 shows a screen presentation of an example model of a server type information handling system.

FIG. 4 shows a screen presentation of an example model of a server type information handling system. Specifically, FIG. 4 depicts an example AR screen presentation 400 presented on a display device of an AR system 204. The AR screen presentation includes a reality screen presentation portion 410 as well as an augmented screen presentation portion 420. In the example model shown in FIG. 4, the reality screen presentation portion 410 presents a depiction of the actual server type information handling system to which the AR system camera is directed. In this example, the depiction of the actual server type information handling system shows the server type information handling system in a closed configuration (i.e., the housing of the information handling system has not been removed) The augmented screen presentation portion 420 presents a superimposed view of components (e.g., components 422, 424, 426) contained within the server type information handling system. With this model of a server type information handling system a technician is able to virtually view each component within the server type information handling system without removing any of the housing enclosing the components of the information handling system.

Figure 5A:
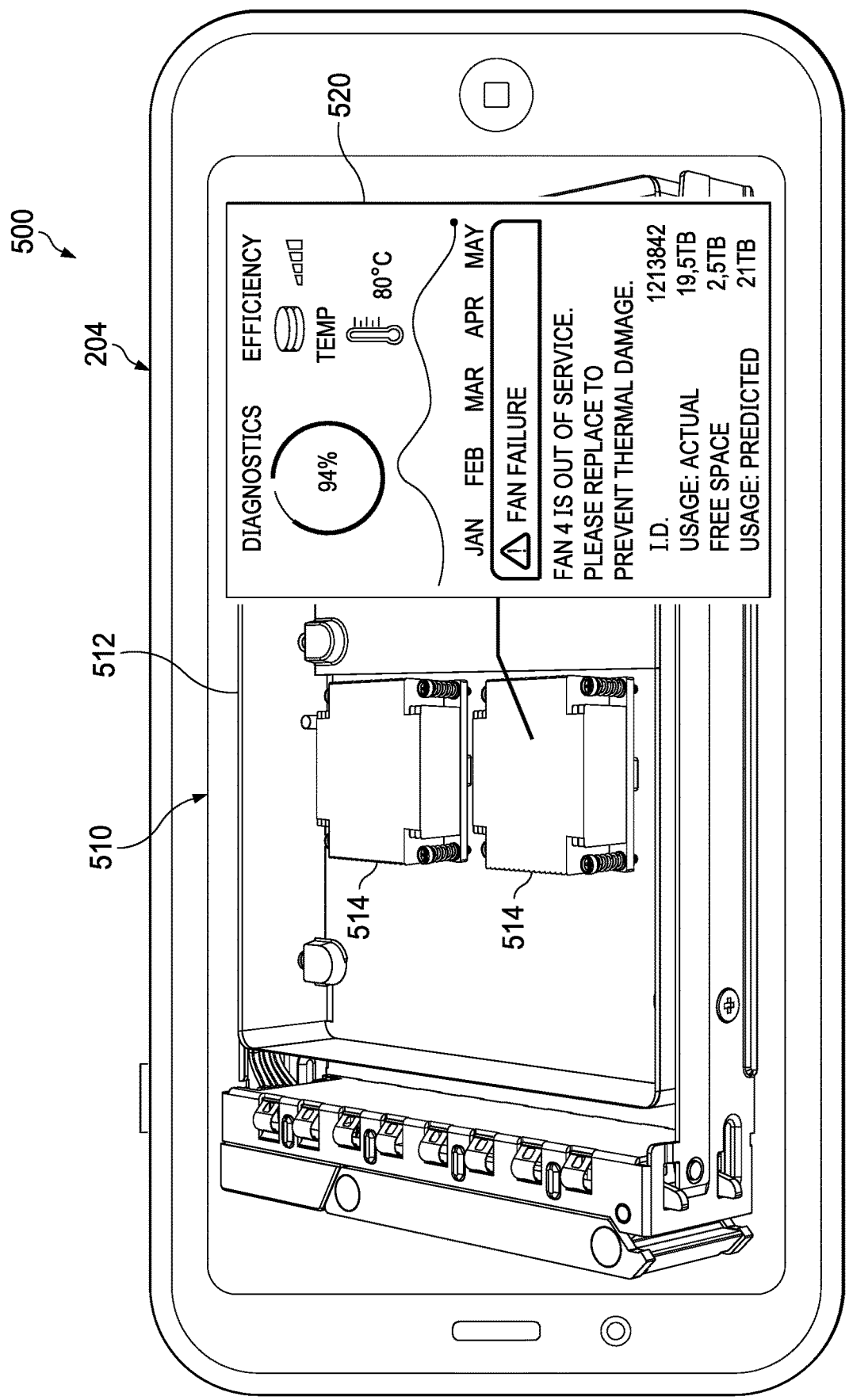
FIGS. 5A and 5B, generally referred to as FIG. 5, show a screen presentation of an example overlay of a server type information handling system.
Figure 5B:
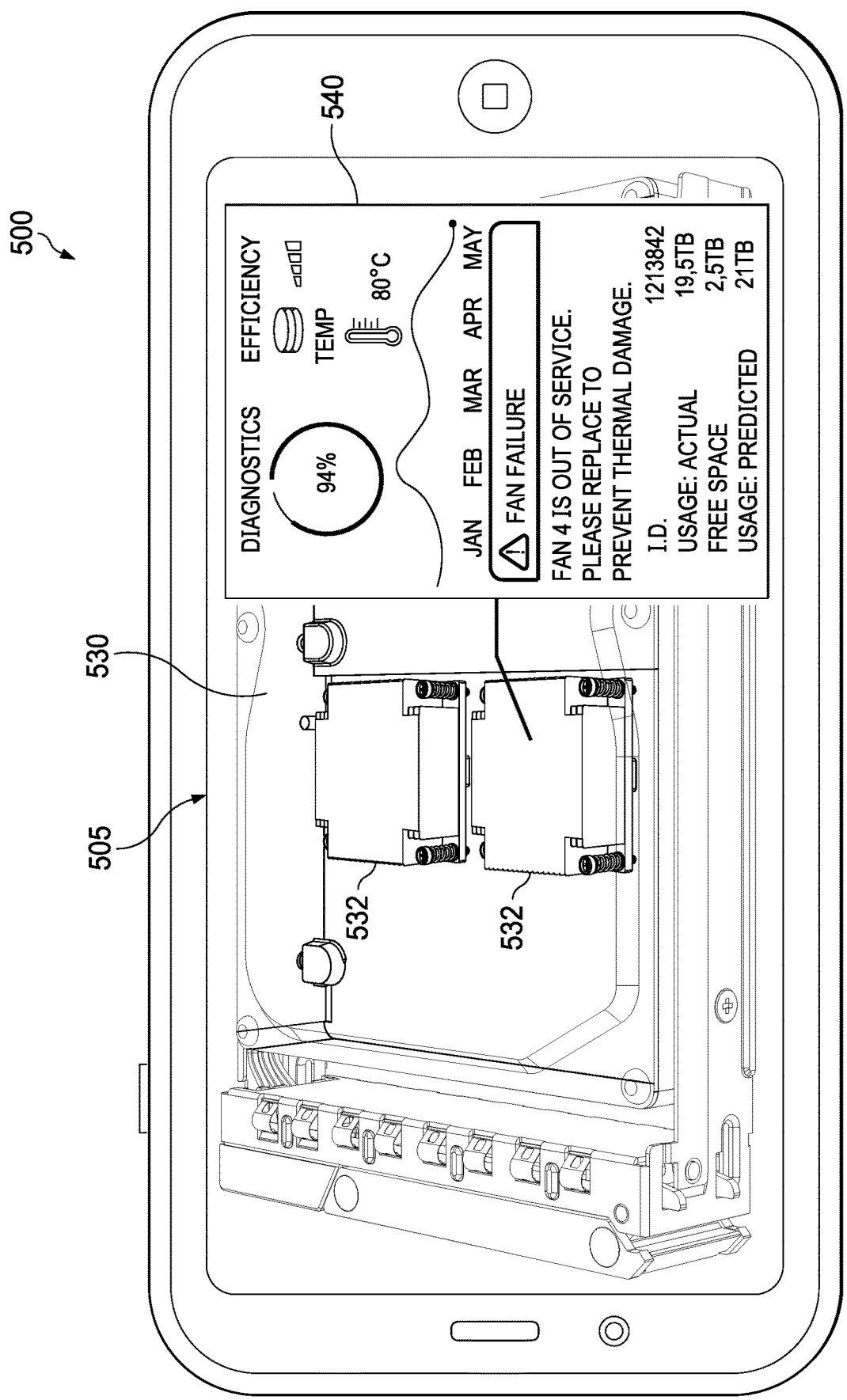

FIGS. 5A and 5B show screen presentations of example performance information associated with a server type information handling system. Specifically, FIG. 5A depicts an example AR screen presentation 500 presented on a display device of an AR system 204. The AR screen presentation includes a reality screen presentation portion 510 as well as an augmented screen presentation portion 520. In the example model shown in FIG. 5A, the reality screen presentation portion 510 presents a depiction of the actual server type information handling system to which the AR system camera is directed. In this example, the depiction of the actual server type information handling system shows the server type information handling system in an open configuration (i.e., the housing of the information handling system has been removed). The depiction of the actual server type information handling system includes an actual view of an open wall 512 of the housing of the information handling system as well as an actual view of one or more components 514 contained within the information handling system. The augmented screen presentation portion 520 presents an overlay of performance information superimposed over the presentation of the depiction of the actual server type information handing system. In the present example, the performance information is associated with a particular component 514 and provides information regarding the performance of the particular component. With this screen presentation of a server type information handling system a technician is able to virtually view performance information associated with components within the server type information handling system.

FIG. 5B depicts an example AR screen presentation 505 presented on a display device of an AR system 204. The AR screen presentation 505 includes a reality screen presentation portion 530 as well as an augmented screen presentation portion 540. In the example model shown in FIG. 5B, the reality screen presentation portion 510 presents a depiction of the actual server type information handling system to which the AR system camera is directed. In this example, the depiction of the actual server type information handling system shows the server type information handling system in a closed configuration (i.e., the housing of the information handling system has not been removed). The augmented screen presentation portion 540 presents a superimposed view of components (e.g., components 532) contained within the server type information handling system (i.e., a model of the server type information handling system) as well as performance information overlay 540 associated with one or more of the superimposed components. In the present example, the performance information is associated with a particular component 532 and provides information regarding the performance of the particular component. With this screen presentation of a server type information handling system a technician is able to virtually view the configuration of the information handling system as well as performance information associated with components within the server type information handling system without removing any of the housing enclosing the components of the information handling system.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for visualizing a system within an information technology (IT) environment, comprising:
   capturing system identification information by an augmented reality (AR) system;
   identifying the system based on the captured system identification information, the system being contained within a rack of systems within the IT environment;
   sending one of a model corresponding to a set of components associated with the identified system or an overlay based on the model to the AR system; and
   displaying the model or the overlay relative to a dynamic image of the system with associated information about the system, the model or overlay presenting diagnostic information and performance information superimposed over the dynamic image of the system, the performance information including historical information regarding the system, the displaying visualizing the system without a need to remove the system from the rack of systems; and wherein
   the overlay comprises a plurality of panes of component performance data, the plurality of panes associating specific respective performance parameters of the component performance data with a component of the set of components, the plurality of panes comprising a thermal pane for visualizing thermal generation and cooling by each component of the set of components, a workload pane for visualizing work performed by each component of the set of components and a power pane for visualizing power usage by each component of the set of components.

2. The method of claim 1, wherein:
   at least one of the model and the overlay is stored in a repository.

3. The method of claim 1, further comprising:
   scanning, by the AR system, the set of internal components of the system;
   identifying component identification information corresponding to a set of components in the system; and
   generating the model based on the component identification information.

4. The method of claim 1, wherein:
   the model is displayed when the system is closed, wherein the overlay is displayed when the system is open.

5. The method of claim 1, wherein:
   the system comprises an internal camera, and the method further comprises
   accessing the internal camera;
   recording the system in operation; and
   displaying the recording of the operation with the model or overlay.

6. A visualization system comprising:
   a processor;
   a data bus coupled to the processor; and
   a non-transitory, computer-readable storage medium embodying computer program code for visualizing a system within an information technology (IT) environment, the non-transitory, computer-readable storage medium being coupled to the data bus, the computer program code interacting with a plurality of computer operations and comprising instructions executable by the processor and configured for:
   receiving system identification information captured by an augmented reality (AR) system;
   identifying the system based on the captured system identification information, the system being contained within a rack of systems within the IT environment;
   sending one of a model corresponding to a set of components associated with the identified system or an overlay based on the model to the AR system; and
   displaying the model or the overlay relative to a dynamic image of the system with associated information about the system, the model or overlay presenting diagnostic information and performance information superimposed over the dynamic image of the system, the performance information including historical information regarding the system, the displaying visualizing the system without a need to remove the system from the rack of systems; and wherein
   the overlay comprises a plurality of panes of component performance data, the plurality of panes associating specific respective performance parameters of the component performance data with a component of the set of components, the plurality of panes comprising a thermal pane for visualizing thermal generation and cooling by each component of the set of components, a workload pane for visualizing work performed by each component of the set of components and a power pane for visualizing power usage by each component of the set of components.

7. The visualization system of claim 6, wherein:
   at least one of the model and the overlay is stored in a repository.

8. The visualization system of claim 6, wherein the instructions are configured for:
   scanning the set of internal components of the system;
   identifying component identification information corresponding to a set of components in the system; and
   generating the model based on the component identification information.

9. The visualization system of claim 6, wherein:
   the model is displayed when the system is closed, wherein the overlay is displayed when the system is open.

10. The visualization system of claim 9, wherein:
    the system comprises an internal camera, and the instructions are further configured for:
    accessing the internal camera;
    recording the system in operation; and
    displaying the recording of the operation with the model or overlay.

11. A non-transitory, computer-readable storage medium embodying computer program code for visualizing a system within an information technology (IT) environment, the computer program code comprising computer executable instructions configured for:
    receiving system identification information captured by an augmented reality (AR) system;
    identifying the system based on the captured system identification information, the system being contained within a rack of systems within the IT environment;
    sending one of a model corresponding to a set of components associated with the identified system or an overlay based on the model to the AR system; and
    displaying the model or the overlay relative to a dynamic image of the system with associated information about the system, the model or overlay presenting diagnostic information and performance information superimposed over the dynamic image of the system, the performance information including historical information regarding the system, the displaying visualizing the system without a need to remove the system from the rack of systems; and wherein the overlay comprises a plurality of panes of component performance data, the plurality of panes associating specific respective performance parameters of the component performance data with a component of the set of components, the plurality of panes comprising a thermal pane for visualizing thermal generation and cooling by each component of the set of components, a workload pane for visualizing work performed by each component of the set of components and a power pane for visualizing power usage by each component of the set of components.

12. The non-transitory, computer-readable storage medium of claim 11, wherein:

at least one of the model and the overlay is stored in a repository.

13. The non-transitory, computer-readable storage medium of claim 11, wherein the computer executable instructions are further configured for:

scanning the set of internal components of the system;

identifying component identification information corresponding to a set of components in the system; and generating the model based on the component identification information.

14. The non-transitory, computer-readable storage medium of claim 11, wherein:

the model is displayed when the system is closed, wherein the overlay is displayed when the system is open.

15. The non-transitory, computer-readable storage medium of claim 11, wherein:

the system comprises an internal camera, and the instructions are further configured for:

accessing the internal camera;

recording the system in operation; and displaying the recording of the operation with the model or overlay.

16. The non-transitory, computer-readable storage medium of claim 11, wherein:

the computer executable instructions are deployable to a client system from a server system at a remote location.

17. The non-transitory, computer-readable storage medium of claim 11, wherein:

the computer executable instructions are provided by a service provider to a user on an on-demand basis.

* * * * *